(12) United States Patent
Qureshi

(10) Patent No.: US 11,487,578 B2
(45) Date of Patent: Nov. 1, 2022

(54) SYSTEMS AND METHODS FOR DYNAMIC SCHEDULING OF DATA PROCESSING

(71) Applicant: SHOPIFY INC., Ottawa (CA)

(72) Inventor: Mohammad Zeeshan Qureshi, Ottawa (CA)

(73) Assignee: SHOPIFY INC., Ottawa (CA)

( * ) Notice: Subject to any disclaimer, the term of this patent is extended or adjusted under 35 U.S.C. 154(b) by 106 days.

(21) Appl. No.: 17/020,082

(22) Filed: Sep. 14, 2020

(65) Prior Publication Data

US 2022/0083376 A1 Mar. 17, 2022

(51) Int. Cl.
*G06F 9/46* (2006.01)
*G06F 9/48* (2006.01)

(52) U.S. Cl.
CPC .................. *G06F 9/4887* (2013.01)

(58) Field of Classification Search
CPC ..................................................... G06F 9/4887
See application file for complete search history.

(56) References Cited

U.S. PATENT DOCUMENTS

| 2011/0191777 A1 | 8/2011 | Bansal et al. |
| 2014/0229221 A1 | 8/2014 | Shih et al. |
| 2015/0033233 A1 | 1/2015 | Hosokawa et al. |

OTHER PUBLICATIONS

European Patent Office, "Extended European Search Report" for EP Patent Application No. 21169632.3 dated Oct. 22, 2021.

*Primary Examiner* — Gregory A Kessler
(74) *Attorney, Agent, or Firm* — Ridout & Maybee LLP

(57) ABSTRACT

Methods and systems for dynamically scheduling data processing are disclosed. An example method includes: identifying a data model to be built, the data model being associated with a data model definition defining input data to be used in building that data model; determining a size of the input data; obtaining an expected access time for the data model; estimating a total time required for building the data model based on the size of the input data and the definition of the data model; determining a time to start building the data model based on the expected access time for the data model and the estimated total time required to build the data model; and scheduling the building of the data model to start at the determined time.

25 Claims, 7 Drawing Sheets

SYSTEMS AND METHODS FOR DYNAMIC SCHEDULING OF DATA PROCESSING

FIELD

The present disclosure relates to scheduling data processing jobs. More specifically, the present disclosure relates to using historical data to dynamically schedule data processing jobs.

BACKGROUND

For any system that needs to process raw data on a periodic basis (e.g. daily), the system typically schedules the processing to start at a static time, e.g., 2 AM each day, which can be predefined by a user or set according to system settings. The static time is usually during a period when computing resources are expected to have greater availability and when the data models are expected to be not yet needed.

In some cases, the scheduling of data processing may be global, which may include multiple data model building processes or jobs. When there are multiple data model building jobs to process, the processing may be batch scheduled, instead of being scheduled on a per-job basis.

SUMMARY

The present disclosure describes various examples for dynamically setting a start time for building data models based on an expected access time for the required data models and an estimated time for building the data models. The expected access time can be predefined based on user input or system settings The estimated time for building the data models can be generated based on historical data. The expected access time can also be estimated based on historical data, in some cases.

The examples described herein may be implemented in the context of an e-commerce platform, or may be made available for use outside of the e-commerce platform.

In some examples, the present disclosure describes methods and systems for dynamically scheduling data processing. An example method includes: identifying a data model to be built, the data model being associated with a data model definition defining input data to be used in building that data model; determining a size of the input data; obtaining an expected access time for the data model; estimating a total time required for building the data model based on the size of the input data and the definition of the data model; determining a time to start building the data model based on the expected access time for the data model and the estimated total time required to build the data model; and scheduling the building of the data model to start at the determined time.

A benefit of the proposed solution is that it aims to schedule the data processing as late as possible in order to capture the latest raw data in the data processing. The start time may be considered a "dynamic" start time (in contrast to the conventional static start time) for building the data model.

In some examples, the present disclosure describes a system including a processing device in communication with a storage. The processing device may be configured to execute instructions to cause the system to: identify a data model to be built, the data model being associated with a data model definition defining input data to be used in building that data model; determine a size of the input data; obtain an expected access time for the data model; estimate a total time required for building the data model based on the size of the input data and the definition of the data model; determine a time to start building the data model based on the expected access time for the data model and the estimated total time required to build the data model; and schedule the building of the data model to start at the determined time.

In some examples, the present disclosure describes a computer readable medium having computer-executable instructions stored thereon. The instructions, when executed by a processing device of a system, cause the system to: identify a data model to be built, the data model being associated with a data model definition defining input data to be used in building that data model; determine a size of the input data; obtain an expected access time for the data model; estimate a total time required for building the data model based on the size of the input data and the definition of the data model; determine a time to start building the data model based on the expected access time for the data model and the estimated total time required to build the data model; and schedule the building of the data model to start at the determined time.

In any of the above examples, the method may include, or the processing device may be further configured to execute instructions to cause the system to perform: determining, prior to the determined time to start building the data model, that the size of the input data has increased; estimating a revised total time required for building the data model based on the increased size of the input data and the definition of the data model, the revised total time greater than the previously estimated total time for building the data model; determining an updated time to start building the data model based on the expected access time for the data model and the revised total time required to build the data model, the updated time being earlier than the previously determined time to start building the data model; and rescheduling the building of the data model to start at the earlier updated time.

In any of the above examples, the method may include, or the processing device may be further configured to execute instructions to cause the system to perform: determining, prior to the determined time to start building the data model, that the size of the input data has decreased; estimating a revised total time required for building the data model based on the decreased size of the input data and the definition of the data model, the revised total time being less than the previously estimated total time for building the data model; determining an updated time to start building the data model based on the expected access time for the data model and the revised total time required for building the data model, the updated time being later than the previously determined time to start building the data model; and rescheduling the building of the data model to start at the later updated time.

In any of the above examples, the method may include, or the processing device may be further configured to execute instructions to cause the system to perform: obtaining, prior to the determined time to start building the data model, an updated expected access time for the data model; determining an updated time to start building the data model based on the updated expected access time for the data model and the estimated total time required for building the data model; and rescheduling the building of the data model to start at the updated time.

In any of the above examples, the size of the input data may be determined based on the expected access time for the data model.

In any of the above examples, the expected access time may be predefined in the data model definition.

In any of the above examples, the expected access time may be determined based on historical records.

In any of the above examples, the total time required for building the at data model may be estimated based on historical records including: data representing a historical time taken to build the data model, data representing a historical time taken to build a different data model that may be similar in structure to the data model or a server capacity when the data model was built.

In any of the above examples, the building of the data model may be dependent on a second data model, and estimating the total time required for building the data model may include estimating a total time required to build the second data model.

In any of the above examples, determining the size of the input data may include: determining a current size of the input data; and estimating an expected size of input data to be generated between a current time and a future time, where the size of the input data may be determined based on a sum of the current size of the input data and the estimated size of input data to be generated.

In any of the above examples, the expected size of input data to be generated may be determined based on an average size of input data previously generated per unit time.

In any of the above examples, the method may include, or the processing device may be further configured to execute instructions to cause the system to perform: determining an amount of computing resources available to build the data model, where the estimate of the total time required for building the data model may be further based on the amount of computing resources available to build the data model.

In any of the above examples, determining the amount of computing resources available may include estimating, based on historical records, a respective amount of computing resources available at each of a plurality of future times.

In any of the above examples, the method may include, or the processing device may be further configured to execute instructions to cause the system to perform: estimating, based on the historical records, a respective total time required for building the data model starting at each of the plurality of future times; and determining the time to start building the data model based on the estimated respective total times required for building the data model starting at each of the plurality of future times.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure will be described in the context of an e-commerce platform, discussed below. However, it should be understood that this discussion is only for the purpose of illustration and is not intended to be limiting. Further, it should be understood that the present disclosure may be implemented in other contexts, and is not necessarily limited to implementation in an e-commerce platform.

Figure 1:
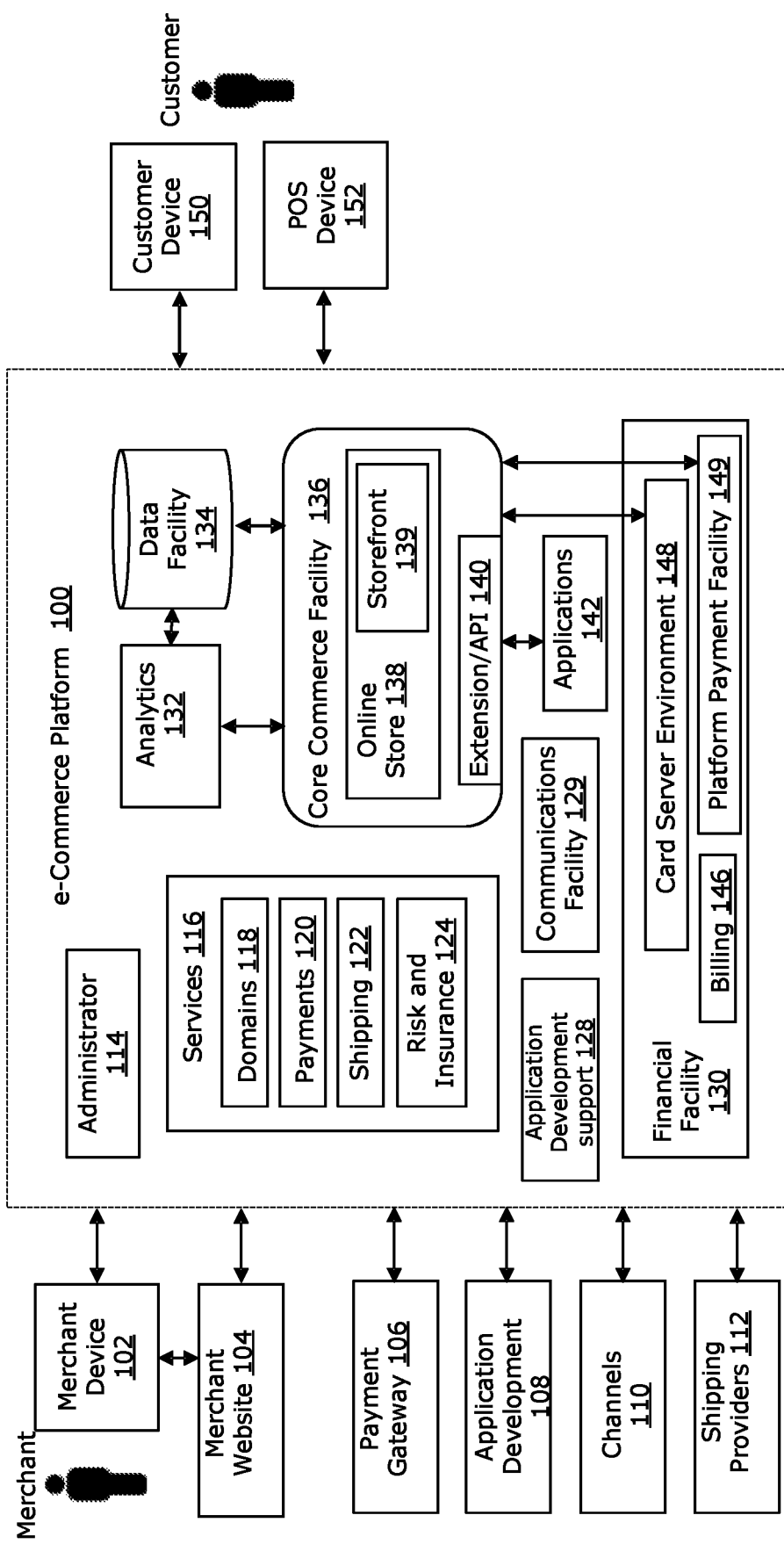
FIG. 1 is a block diagram of an example e-commerce platform, in which examples described herein may be implemented.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products or offerings. All references to products or offerings throughout this disclosure should also be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, it should be understood that aspects of the e-commerce platform 100 may be more generally available to support users in an e-commerce environment, and all references to merchants and customers throughout this disclosure should also be understood to be references to users, such as where a user is a merchant-user (e.g., a seller, retailer, wholesaler, or provider of products), a marketer-user (e.g., a marketing agent, an external marketing service provider, or a self-marketing merchant), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Further, it should be understood that any individual or group of individuals may play more than one role and may fit more than one label in the e-commerce environment. For example, a merchant may be a marketer, or a corporate user may also be a customer.

The e-commerce platform 100 may provide a centralized system for providing merchants with online resources for managing their business. Merchants may utilize the e-commerce platform 100 for managing commerce with customers, such as by implementing an e-commerce experience with customers through an online store 138, through channels 110, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof.

The online store 138 may represent a multitenant facility comprising a plurality of virtual storefronts 139. In various embodiments, merchants may manage one or more storefronts 139 in the online store 138, such as through a merchant device 102 (e.g., computer, laptop computer, mobile computing device, and the like), and offer products to customers through a number of different channels 110 (e.g., an online store 138; a physical storefront through a POS device 152; electronic marketplace, through an electronic buy button integrated into a website or social media channel such as on a social network, social media page, social media messaging system; and the like). A merchant may sell across channels 110 and then manage their sales through the e-commerce platform 100. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront 139 through the online store 138, and utilizing the communications facility 129 to leverage customer interactions and analytics 132 to improve the probability of sales, for example.

In various embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, and as described further herein, the e-commerce platform 100 may be implemented through a processing facility including a processing device and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application development 108, channels 110, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices, and the like). In various embodiments, elements of the e-commerce platform 100 may be implemented to operate on various platforms and operating systems, such as iOS, Android, over the internet, and the like.

In various embodiments, storefronts 139 may be served by the e-commerce platform 100 to customers (e.g., via customer devices 150), where customers can browse and purchase the various products available (e.g., add them to a cart, purchase immediately through a buy-button, and the like). Storefronts 139 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their storefront 139. Merchants may customize the look and feel of their website through a theme system, such as where merchants can select and change the look and feel of their storefront 139 by changing their theme while having the same underlying product and business data shown within the storefront's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a basic content management system for website content. Merchants may author blog posts or static pages and publish them to their storefront 139 and/or website 104, such as through blogs, articles, and the like, as well as configure navigation menus. Merchants may upload images (e.g., for products), video, content, data, and the like to the e-commerce platform 100, such as for storage by the system. In various embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110, including the online store 138, over the telephone, as well as through physical POS devices 152 as described herein. The e-commerce platform 100 may provide business support services 116, an administrator component 114, and the like associated with running an online business, such as providing a domain service 118 associated with their online store, payments services 120 for facilitating transactions with a customer, shipping services 122 for providing customer shipping options for purchased products, risk and insurance services 124 associated with product protection and liability, merchant billing services 146, and the like. Services 116 may be provided via the e-commerce platform 100 or in association with external facilities, such as through a payment gateway 106 for payment processing, shipping providers 112 for expediting the shipment of products, and the like.

In various embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
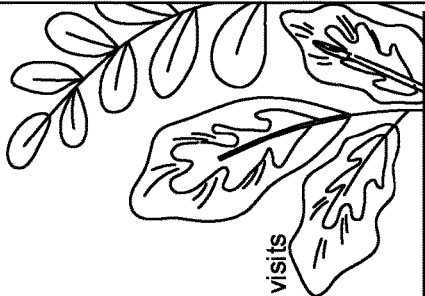
FIG. 2 is an example homepage of an administrator, which may be accessed via the e-commerce platform of FIG. 1.

FIG. 2 depicts a non-limiting embodiment for a home page 170 of an administrator 114, which may show information about daily tasks, a store's recent activity, and the next steps a merchant can take to build their business. In various embodiments, a merchant may log in to administrator 114, such as from a browser or mobile device, and manage aspects of their storefront, such as viewing the storefront's recent activity, updating the storefront's catalog, managing orders, recent visits activity, total orders activity, and the like. In various embodiments, the merchant may be able to access the different sections of administrator 114 by using the sidebar 172, such as shown on FIG. 2. Sections of the administrator may include core aspects of a merchant's business, including orders, products, and customers; sales channels, including the online store, POS, and buy button; applications installed on the merchant's account; settings applied to a merchant's storefront 139 and account. A merchant may use a search bar 174 to find products, pages, or other information. Depending on the device the merchant is using, they may be enabled for different functionality through the administrator 114. For instance, if a merchant logs in to the administrator 114 from a browser, they may be able to manage all aspects of their storefront 139. If the merchant logs in from their mobile device, they may be able to view all or a subset of the aspects of their storefront 139, such as viewing the storefront's recent activity, updating the storefront's catalog, managing orders, and the like.

More detailed information about commerce and visitors to a merchant's storefront 139 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110 from different periods of time (e.g., days, weeks, months, and the like), such as by using drop-down menus 176. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's storefront 139, such as based on account status, growth, recent customer activity, and the like. Notifications may be provided to assist a merchant with navigating through a process, such as capturing a payment, marking an order as fulfilled, archiving an order that is complete, and the like.

Reference is made back to FIG. 1. The e-commerce platform may provide for a communications facility 129 and associated merchant interface for providing electronic communications and marketing, such as utilizing an electronic messaging aggregation facility (not shown) for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 130 for secure financial transactions with customers, such as through a secure card server environment 148. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 130 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In various embodiments, online store 138 may support a great number of independently administered storefronts 139 and process a large volume of transactional data on a daily basis for a variety of products. Transactional data may include customer contact information, billing information, shipping information, information on products purchased, information on services rendered, and any other information associated with business through the e-commerce platform 100. In various embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

In various embodiments, the e-commerce platform 100 may be configured with a core commerce facility 136 for content management and task automation to enable support and services to the plurality of storefronts 139 (e.g., related to products, inventory, customers, orders, collaboration, suppliers, reports, financials, risk and fraud, and the like), but be extensible through applications 142 that enable greater flexibility and custom processes required for accommodating an ever-growing variety of merchant storefronts 139, POS devices 152, products, and services. For instance, the core commerce facility 136 may be configured for flexibility and scalability through portioning (e.g., sharding) of functions and data, such as by customer identifier, order identifier, storefront identifier, and the like. The core commerce facility 136 may accommodate store-specific business logic and a web administrator. The online store 138 may represent a channel, be embedded within the core commerce facility 136, provide a set of support and debug tools that support uses for merchants, and the like. The core commerce facility 136 may provide centralized management of critical data for storefronts 139.

The core commerce facility 136 includes base or "core" functions of the e-commerce platform 100, and as such, as described herein, not all functions supporting storefronts 139 may be appropriate for inclusion. For instance, functions for inclusion into the core commerce facility 136 may need to exceed a core functionality threshold through which it may be determined that the function is core to a commerce experience (e.g., common to a majority of storefront activity, such as across channels, administrator interfaces, merchant locations, industries, product types, and the like), is reusable across storefronts (e.g., functions that can be re-used/modified across core functions), limited to the context of a single storefront at a time (e.g., implementing a storefront 'isolation principle', where code should not be able to interact with multiple storefronts at a time, ensuring that storefronts cannot access each other's data), provide a transactional workload, and the like. Maintaining control of what functions are implemented may enable the core commerce facility 136 to remain responsive, as many required features are either served directly by the core commerce facility 136 or enabled by its extension/application programming interface (API) 140 connection to applications 142. If care is not given to restricting functionality in the core commerce facility 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 136 may be configured to maintain responsiveness, such as through configuration that utilizes timeouts, queues, backpressure to prevent degradation, and the like.

Although isolating storefront data is important to maintaining data privacy between storefronts 139 and merchants, there may be reasons for collecting and using cross-store data, such as for example, with an order risk assessment system or a platform payment facility, both of which require information from a majority of storefronts 139 to perform well. In various embodiments, rather than violating the isolation principle, it may be preferred to move these components out of the core commerce facility 136 and into their own infrastructure within the e-commerce platform 100. For example, the data facility 134 and analytics 132 may be located outside the core commerce facility 136.

In various embodiments, the e-commerce platform 100 may provide for a platform payment facility 149, which is another example of a component that utilizes data from the core commerce facility 138 but may be located outside so as to not violate the isolation principle. The platform payment facility 149 may allow customers interacting with storefronts 139 to have their payment information stored safely by the core commerce facility 136 such that they only have to enter it once. When a customer visits a different storefront 139, even if they've never been there before, the platform payment facility 149 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 139. It would be difficult and error prone for each storefront 139 to be able to connect to any other storefront 139 to directly retrieve the payment information stored there. As a result, the platform payment facility 149 may be implemented external to the core commerce facility 136.

For those functions that are not included within the core commerce facility 138, applications 142 provide a way to add features to the e-commerce platform 100. Applications 142 may be able to access and modify data on a merchant's storefront 139, perform tasks through the administrator 114, create new flows for a merchant through a user interface (e.g., that is surfaced through extensions/API 140), and the like. Merchants may be enabled to discover and install applications 142 through application searching 208 and application recommendations 210 (see FIG. 3). In various embodiments, core products, core extension points, applications, and the administrator 114 may be developed to work together. For instance, application extension points may be built inside the administrator 114 so that core features may be extended by way of applications 142, which may deliver functionality to a merchant through the extension/API 140.

In various embodiments, applications 142 may deliver functionality to a merchant through the extension/API 140, such as where an application 142 is able to surface transaction data to a merchant (e.g., App: "Surface my app in mobile and web admin using the embedded app SDK"), and/or where the core commerce facility 136 is able to ask the application to perform work on demand (core: "App, give me a local tax calculation for this checkout").

Applications 142 may support storefronts 139 and channels 110, provide merchant support, integrate with other services, and the like. Where the core commerce facility 136 may provide the foundation of services to the storefront 139, the applications 142 may provide a way for merchants to satisfy specific and sometimes unique needs. Different merchants will have different needs, and so may benefit from different applications 142. Applications 142 may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142 may be connected to the core commerce facility 136 through an extension/API layer 140, such as utilizing APIs to expose the functionality and data available through and within the core commerce facility 136 to the functionality of applications (e.g., through REST, GraphQL, and the like). For instance, the e-commerce platform 100 may provide API interfaces to merchant and partner-facing products and services, such as including application extensions, process flow services, developer-facing resources, and the like. With customers more frequently using mobile devices for shopping, applications 142 related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the core commerce facility 136, thus providing merchants what they need when they need it. For instance, shipping services 122 may be integrated with the core commerce facility 136 through a shipping or carrier service API, thus enabling the e-commerce platform 100 to provide shipping service functionality without directly impacting code running in the core commerce facility 136.

Many merchant problems may be solved by letting partners improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 142, through extension/API 140, help make products easy to view and purchase in a fast growing marketplace. In various embodiments, partners, application developers, internal applications facilities, and the like, may be provided with a software development kit (SDK), such as through creating a frame within the administrator 114 that sandboxes an application interface. In various embodiments, the administrator 114 may not have control over nor be aware of what happens within the frame. The SDK may be used in conjunction with a user interface kit to produce interfaces that mimic the look and feel of the e-commerce platform 100, such as acting as an extension of the core commerce facility 136.

Applications 142 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 136, such as for synchronizing a local database, notifying an external integration partner, and the like. Update events may enable this functionality without having to poll the core commerce facility 136 all the time to check for updates, such as through an update event subscription. In various embodiments, when a change related to an update event subscription occurs, the core commerce facility 136 may post a request, such as to a predefined callback URL. The body of this request may contain a new state of the object and a description of the action or event. Update event subscriptions may be created manually, in the administrator facility 114, or automatically (e.g., via the API). In various embodiments, update events may be queued and processed asynchronously from a state change that triggered them, which may produce an update event notification that is not distributed in real-time.

Figure 3:
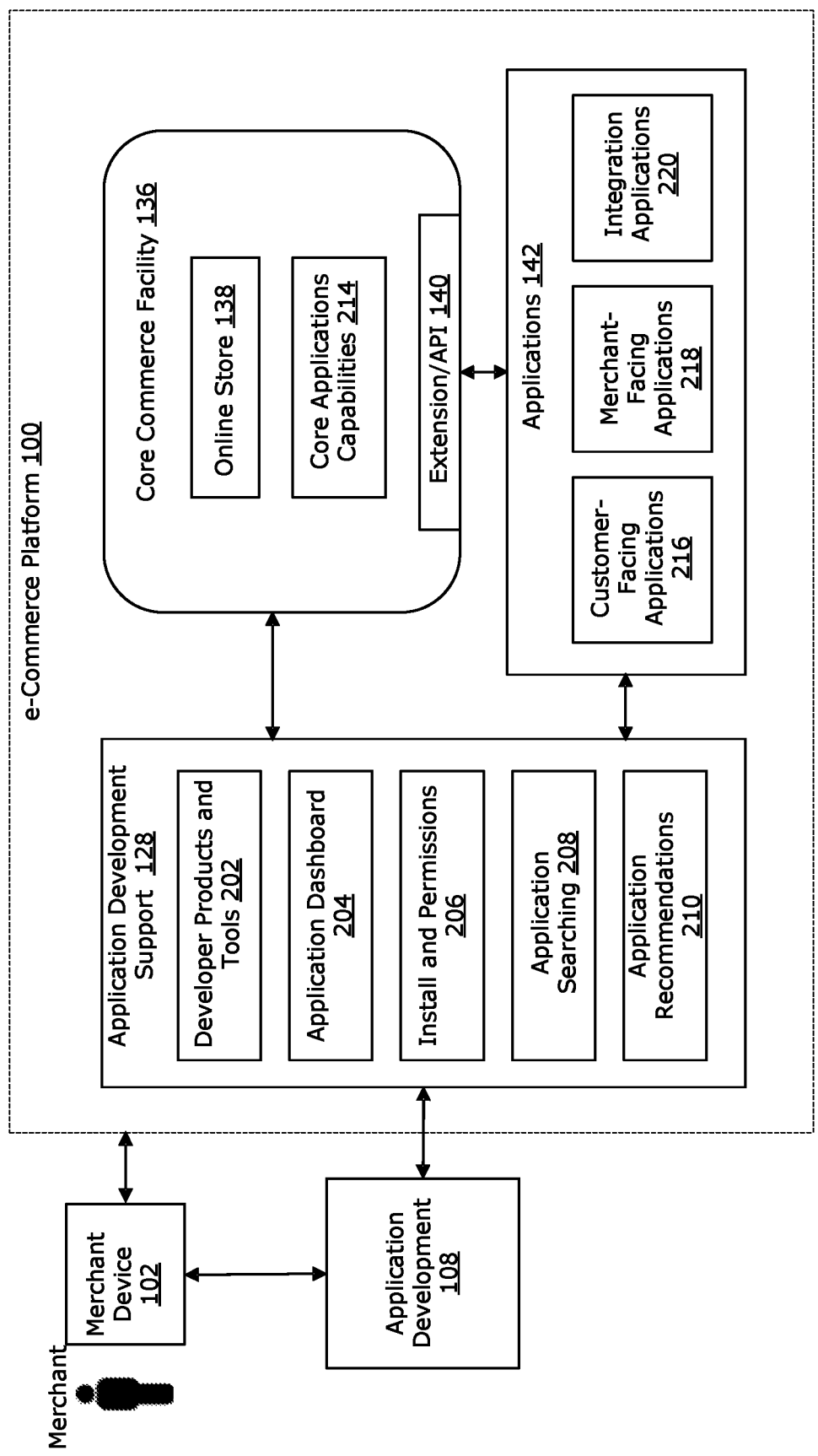
FIG. 3 is another block diagram of the e-commerce platform of FIG. 1, showing some details related to application development.

Reference is made to FIG. 3, which is another depiction of the e-commerce platform 100. FIG. 3 omits some details that have been described with reference to FIG. 1, and shows further details discussed below. In various embodiments, the e-commerce platform 100 may provide application development support 128. Application development support 128 may include developer products and tools 202 to aid in the development of applications, an application dashboard 204 (e.g., to provide developers with a development interface, to administrators for management of applications, to merchants for customization of applications, and the like), facilities for installing and providing permissions 206 with respect to providing access to an application 142 (e.g., for public access, such as where criteria must be met before being installed, or for private use by a merchant), application searching 208 to make it easy for a merchant to search for applications 142 that satisfy a need for their storefront 139, application recommendations 210 to provide merchants with suggestions on how they can improve the user experience through their storefront 139, a description of core application capabilities 214 within the core commerce facility 136, and the like. These support facilities may be utilized by application development 108 performed by any entity, including the merchant developing their own application 142, a third-party developer developing an application 142 (e.g., contracted by a merchant, developed on their own to offer to the public, contracted for use in association with the e-commerce platform 100, and the like), or an application being developed by internal personal resources associated with the e-commerce platform 100. In various embodiments, applications 142 may be assigned an application identifier (ID), such as for linking to an application (e.g., through an API), searching for an application, making application recommendations, and the like.

The core commerce facility 136 may include base functions of the e-commerce platform 100 and expose these functions through APIs to applications 142. The APIs may enable different types of applications built through application development 108. Applications 142 may be capable of satisfying a great variety of needs for merchants but may be grouped roughly into three categories: customer-facing applications 216, merchant-facing applications 218, or integration applications 220. Customer-facing applications 216 may include storefront 139 or channels 110 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 218 may include applications that allow the merchant to administer their storefront 139 (e.g., through applications related to the web or website or to mobile devices), run their business (e.g., through applications related to POS devices 152), to grow their business (e.g., through applications related to shipping (e.g., drop shipping), use of automated agents, use of process flow development and improvements), and the like. Integration applications 220 may include applications that provide useful integrations that participate in the running of a business, such as shipping providers 112 and payment gateways.

In various embodiments, an application developer may use an application proxy to fetch data from an outside location and display it on the page of an online storefront 139. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142 so that the core commerce facility 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 110. A channel 110 is a place where customers can view and buy products. In various embodiments, channels 110 may be modeled as applications 142 (a possible exception being the online store 138, which is integrated within the core commence facility 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110 may use the core commerce facility 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through the card server environment 148. In various embodiments, the payment gateway 106 may accept international payment, such as integrating with leading international credit card processors. The card server environment 148 may include a card server application, card sink, hosted fields, and the like. This environment may act as the secure gatekeeper of the sensitive credit card information.

Figure 4:
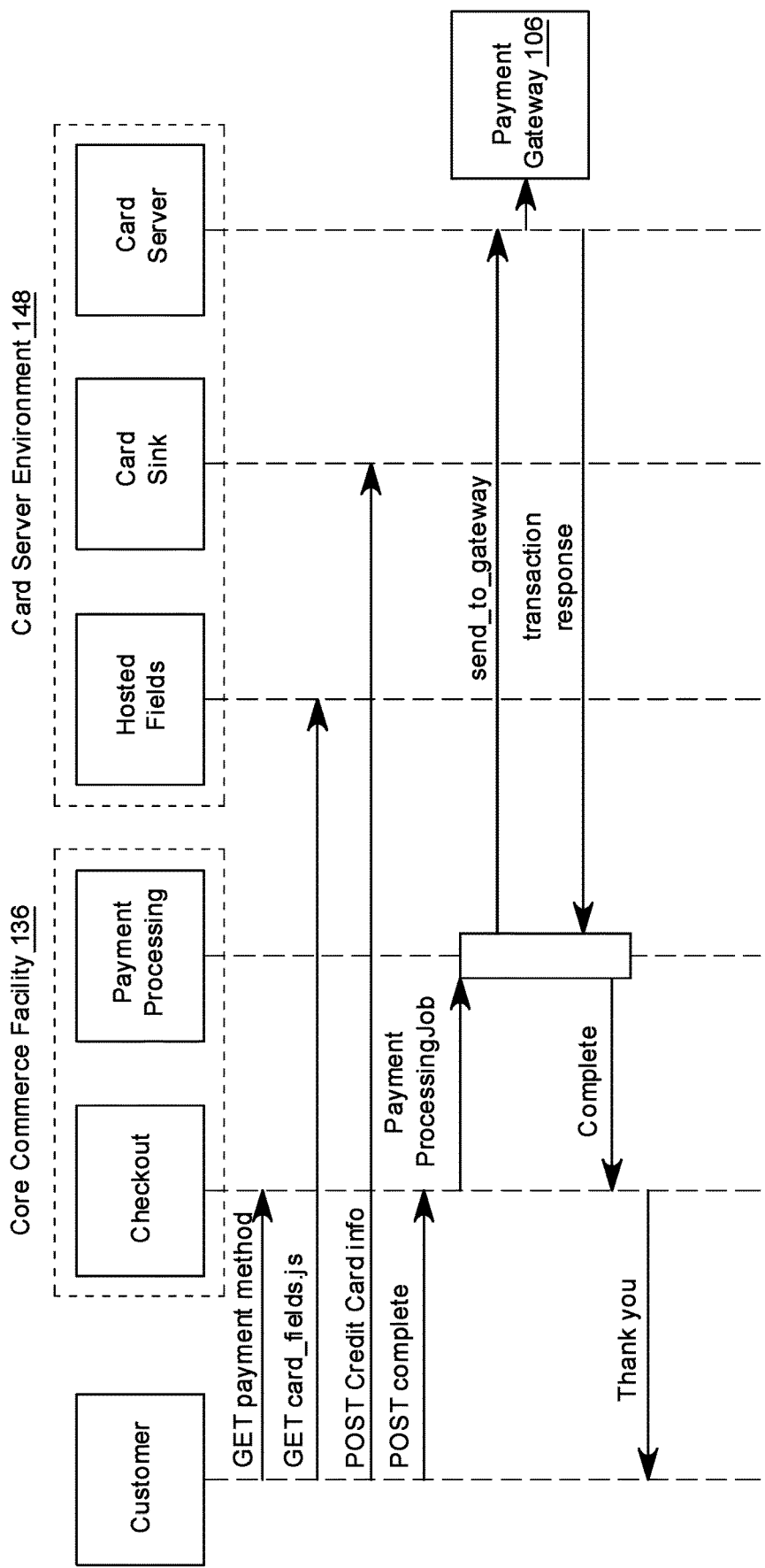
FIG. 4 shows an example data flow that may take place when a purchase is made using the e-commerce platform of FIG. 1.

FIG. 4 presents, in a non-limiting example, a simplified sequence diagram of the interactions between the core commerce facility 136 and the card server environment 148 during payment processing of a credit, prepaid, gift or other card on a Web Checkout.

In various embodiments, most of the process may be orchestrated by a payment processing job. The core commerce facility 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor). The merchant may then view and fulfill (or cancel) the order.

An order assessment component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In various embodiments, this business process may be implemented by a fulfillment component. The fulfillment component may group the line items of the order into a logical fulfillment unit of work based on an inventory location and fulfillment service. The merchant may assess the order, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the core commerce facility 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a returns component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that were not returned and remain in the customer's hands); and the like. A return may represent a change to the contract of sale (e.g., the order), and where the e-commerce platform 100 may make the merchant aware of compliance issues with respect to legal obligations (e.g., with respect to taxes). In various embodiments, the e-commerce platform 100 may enable merchants to keep track of changes to the contract of sales over time, such as implemented through a sales model component (e.g., an append-only date-based ledger that records sale-related events that happened to an item).

Figure 5:
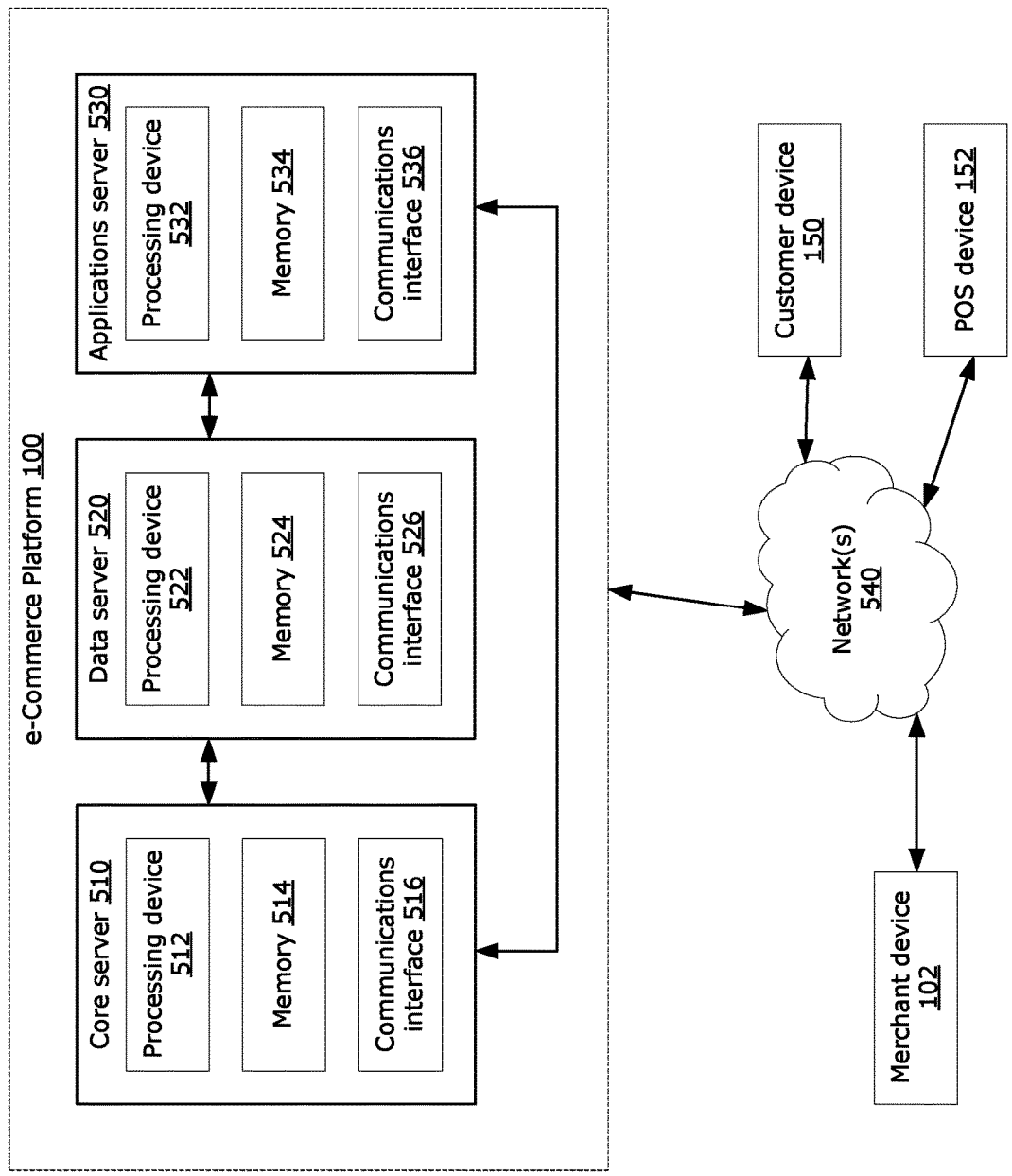
FIG. 5 is a block diagram illustrating an example implementation of the e-commerce platform of FIG. 1.

FIG. 5 is a block diagram of an example hardware configuration of the e-commerce platform 100. It should be noted that different components of the e-commerce platform 100 (e.g., the data facility 134, analytics facility 132, core commerce facility 136 and applications 142) may be implemented in separate hardware or software components, on a common hardware component or server or configured as a common (integrated) service or engine in the e-commerce platform 100. In the example of FIG. 5, the e-commerce platform 100 includes a core server 510, a data server 520 and an applications server 530, which are each in communication with each other (e.g., via wired connections and/or via wireless intranet connections). Each of the servers 510, 520, 530 include a respective processing device 512, 522, 532 (each of which may be, for example, a microprocessor, graphical processing unit, digital signal processor or other computational element), a respective memory 514, 524, 534 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 516, 526, 536 (each of which may include transmitter, receiver and/or transceiver for wired and/or wireless communications). The core server 510 may store instructions and perform operations relevant to core capabilities of the e-commerce platform, such as providing the administrator 114, analytics 132, core commerce facility 136, services 116 and/or financial facility 130, among others. The data server 520 may be used to implement the data facility 134, among others. The applications server 530 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 540 (e.g., wired and/or wireless networks, including a virtual private network (VPN), the Internet, and the like).

Although FIG. 5 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 514, 524, 534 may be replaced with external storage or cloud-based storage, among other possible modifications.

As stated earlier, setting a static time to start building data models can lead to certain problems. For example, a sudden spike in the amount of data being processed during data model building may lead to longer-than-expected processing time, which in turn may make the availability of the data models unpredictable. This problem may be compounded if there is a large number of data models that are scheduled to be built at (or around) the same time.

In addition, when the data models are scheduled to be built at a static start time, there is typically a cut-off time for collecting the unprocessed data used to build the data models. This may result in failing to capture the latest unprocessed data that may be received after the cut-off time but that still could potentially be useful to include in the updated data models.

Figure 6:
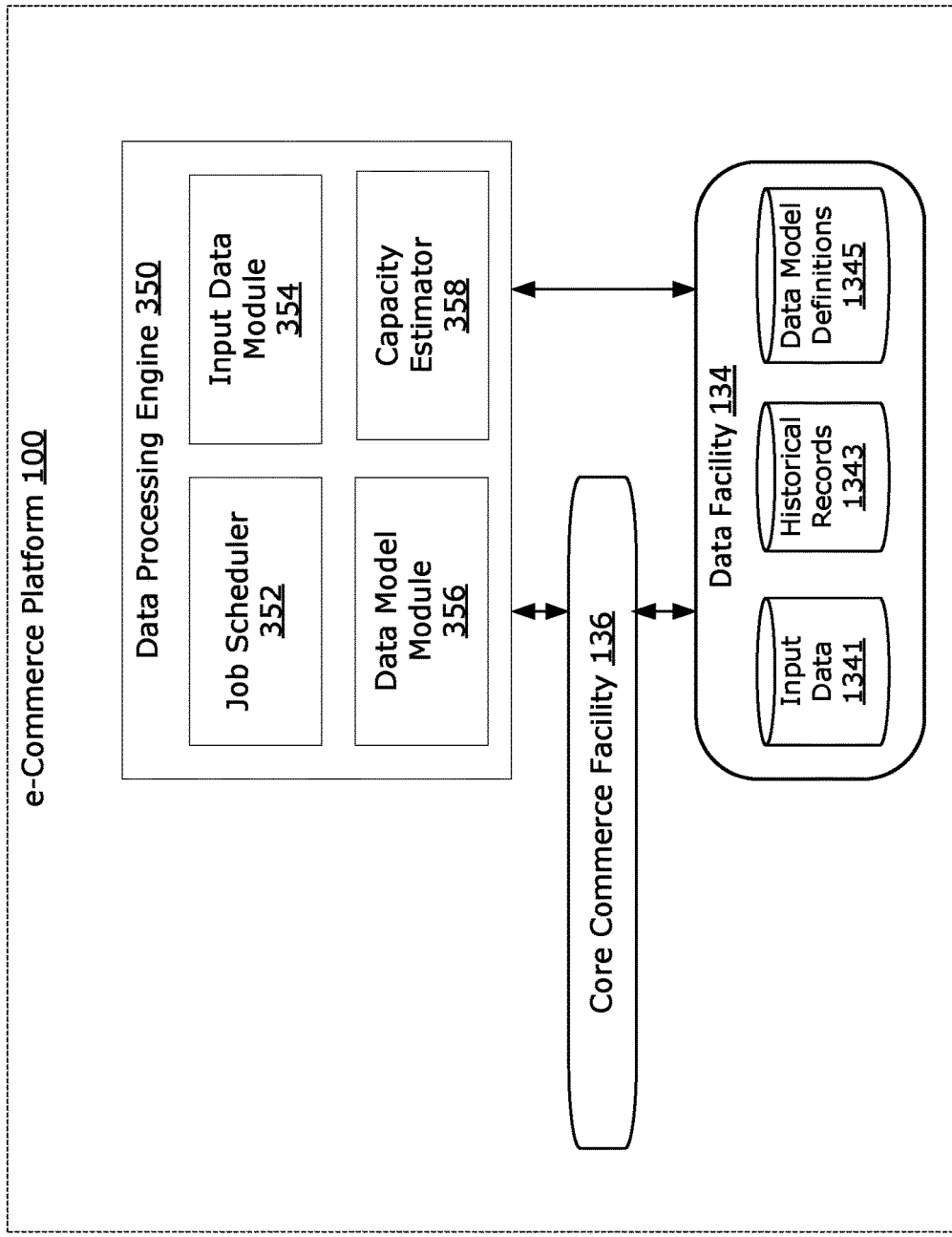
FIG. 6 is another block diagram of the e-commerce platform of FIG. 1, showing some details related to a data processing engine.

FIG. 6 illustrates some details of the e-commerce platform 100 that are relevant to a data processing engine 350 configured to dynamically schedule jobs for building data models, which can help with resolving some of the issues mentioned above.

Although the engine 350 is illustrated as a distinct component of the e-commerce platform 100 in FIG. 6, this is only an example. An engine could also or instead be provided by another component residing within or external to the e-commerce platform 100. In some embodiments, either or both of the applications 142 provide an engine that implements the functionality described herein to make it available to customers and/or to merchants. Furthermore, in some embodiments, the core commerce facility 136 provides that engine. The e-commerce platform 100 could include multiple engines that are provided by one or more parties. The multiple engines could be implemented in the same way, in similar ways and/or in distinct ways. In addition, at least a portion of an engine could be implemented in the merchant device 102 and/or in the customer device 150. For example, the customer device 150 could store and run an engine locally as a software application.

As discussed in further detail below, the engine 350 could implement at least some of the functionality described herein. Although the embodiments described below may be implemented in association with an e-commerce platform, such as (but not limited to) the e-commerce platform 100, the embodiments described below are not limited to e-commerce platforms. Generally, the engine 350 can be implemented as a stand-alone service or system configured to dynamically schedule jobs for building data models for any application, not just for electronic commerce or on-line stores.

In the example of FIG. 6, the data processing engine 350 includes a job scheduler 352, an input data module 354, a data model module 356, and a capacity estimator 358. Each of the job scheduler 352, an input data module 354, a data model module 356, and a capacity estimator 358 may be implemented as a sub-module of the data processing engine 350 or may be implemented as part of the general functions of the data processing engine 350. The data processing engine 350 connects to the data facility 134, which includes input data 1341, historical records 1343, and data model definitions 1345. The job scheduler 352, input data module 354, the data model module 356, and the capacity estimator 358 are configured to access the input data 1341, historical records 1343, or data model definitions 1345, when needed, in order to determine a respective start time $T_C$ to build each data model required at an expected access time $T_A$. In the next few paragraphs, input data 1341, historical records 1343, and data model definitions 1345 are described first, followed by a detailed description of embodiments of data processing engine 350.

The data facility 134 receives and stores different types of input data 1341 generated during operations of the e-commerce platform 100, in real time or in batch. The different types of input data 1341 may include, for example, anonymized user profile data, transactional data, storefront data, and so on. Transactional data may include, for example, customer contact information, billing information, shipping information, information on products purchased, information on services rendered, and any other information associated with business through the e-commerce platform 100.

Even though FIG. 6 shows the data processing engine 350 being connected to the core commerce facility 136, in some embodiments, the data processing engine 350 may not interact with the core commerce facility 136 directly. For example, for reasons related to system capacity or data integrity, the data processing engine 350 may be instead connected to a data warehouse system (not shown) or an interposed cache copy of the core commerce facility 136, in order to process data models. It is not necessary for the data processing engine 350 to be connected to the core commerce facility 136 in order to process data generated during the operation of the core commerce facility 136.

For instance, a data warehouse system of the core commerce facility 136 may be implemented and used for reporting and data analysis. The data warehouse system may store current and historical data, and may include the data facility 134, or a copy of the data facility 134. The data stored in the warehouse may be uploaded from the core commerce facility 136 or the data facility 134. The data processing engine 350 may be connected to the data warehouse system in order process data generated during the operation the core commerce facility 136.

Each user of the e-commerce platform 100 may have a user account; the user account may have a user identifier (ID). Anonymized user profile data may include, for example, for a given user account ID: browsing history, purchase history, wish list, shopping cart content, geographical region, language preference, de-identified membership information, and so on. When the data processing engine 350 (which may be the job scheduler 352, the input data module 354, the data model module 356, or the capacity estimator 358) queries the data facility 134 based on a user ID of a user account, the data processing engine 350 may be able to access and retrieve the anonymized user profile data.

In various embodiments, storefront data may include information regarding one or more specific online stores 138 based on an identification of a merchant. For example, a merchant may have a user account with a user identifier (ID). The merchant may have one or more online stores 138, and each of the one or more online stores 138 may be associated independently with the user ID. Each online store 138 may have a store ID, and has various information stored in the data facility 134 under the store ID. An online store 138 may support one or more independently administered storefronts 139, where a storefront 139 may be represented by a URL; that is, an online store 138 having a store ID may have one or more URLs, with each URL configured for a different storefront 139. All of the URLs under the same store ID may be stored in the data facility 134. The online store 138 needs to have one or more product offerings listed in a storefront 139, and each listed product offering needs to have an associated inventory count thereof. Storefront data including product offering listings and individual inventory count for each product offering may be stored in the data facility 134 under a specific store ID and in turn linked to a specific user ID. The online store 138 also may have a delivery configuration set up in place for shipping and delivering the ordered product offerings to the customers. The delivery configuration may include at least a default shipping method (e.g. FedEx®) as well as associated shipping charges. The delivery configuration may be stored in the data facility 134 under a specific store ID and in turn linked to a specific user ID. When the data processing engine 350 queries the data facility 134 based on a user ID of a user account of a merchant, the data processing engine 350 may be able to access a number of input data 1341 regarding one or more online stores 138 of a specific merchant linked to the user ID, including one or more URLs of the one or more online stores 138, one or more payment rails, one or more bank deposit information, one or more product listings and associated inventory count thereof, and one or more delivery configurations for each online store 138.

Other types of input data 1341 may be stored in the data facility 134. In various embodiments, relational databases may be used to store the input data 1341, and SQL (Structured Query Language) may be used for querying and maintaining the databases. Some of the input data 1341 may be raw data, which have not been processed at all; some of the input data 1341 may be pre-processed, for example, some data may have been cleaned or normalized prior to being stored as input data 1341.

Historical records 1343 includes records of past data that have been processed to date. In some embodiments, historical records 1343 may overlap with input data 1341, such as input data 1341 that have already been processed by the data processing engine 350. Historical data 1343 may include, for example, past transactional data or anonymized user profile data having a timestamp older than a predefined threshold (e.g. 24 hours), or metadata about past events and data models, such as an expected access time for a data model, a type of the data model, a size of the data model, or a total time spent on building the data model. The historical records 1343 may include types and amount of computing resources available at any given time in the past day, week, month or year. For example, the historical records 1343 may include, at 3 PM on Jan. 23, 2020, the computing resources available for data processing consist of: 20 servers, each server having X amount of RAM, and Y amount of CPU. The historical records 1343 may further include past data models, which may be built based on past input data 1341.

An example snapshot of a table saved in historical records 1343 may contain information shown below:

| Data model No. | 001 | 002 | 003 |
| --- | --- | --- | --- |
| Size of input data | 10 billion rows | 10 billion rows | 20 billion rows |
| Type of input data | transactional data | transactional data | storefront data |
| Average historical processing time | 30 minutes | 15 minutes | 50 minutes |
| Average start time | 3:00 AM | 3:00 AM | 2:00 AM |
| Average end time | 3:30 AM | 3:15 AM | 2:50 AM |
| Average number of servers during data model build | 100 | 100 | 80 |

The size of input data may be represented in terms of rows as shown in the table above, or in other manners such as, for example, in terms of a standard data size unit such as bit, byte, kilobytes (KB), megabytes (MB), gigabyte (GB), terabyte (TB) and so on. For the purpose of this disclosure, the phrase "size of input data" and the phrase "rows of input data" may be interchangeable, and they both may refer to a size of input data that can be measured in rows, bits, bytes, or any other suitable unit for representing a size of electronic data stored on a memory storage device.

An average number of servers (e.g., server capacity) available for use in processing data, as well as an average number of servers that were used for processing data may be stored in historical records 1343. Other recorded statistics for historically available or used computing resources can include, for example, an average number of CPU processors, an average amount of RAM, an average disk I/O speed, and so on.

Data model definitions 1345 may include a table or list of data model definitions, each associated with a unique identifier and including information such as a logical data model structure and/or a physical data model structure. An example of a data model is a data model for an outstanding (unfulfilled) order, and the associated logical data model structure for that data model may include one or more data entities from, for example: an order number, a total number of items sold in the order, a merchant ID, and a storefront ID. The logical data model structure can also include one or more data models including, for example, an item data model for each product offering sold in the order, a customer (purchaser) data model, a payment data model, and a shipment data model. The item data model may include, for example, for each product offering in the order: a product offering ID, a SKU number, a warehouse location, and an item price. The customer data model may include, for example, a customer ID, a membership ID (if applicable), a shipping address for the customer, and a billing address for the customer. The payment data model may include, for example, a payment confirmation number as sent from the financial facility 130, a payment type, and a total payment amount. The shipment data model may include, for example, a shipping address, a courier, an estimated shipping date, and a phone number associated with the shipping address.

A corresponding physical data model structure may include, for each data entity in the logical data model structure, for example, a data entity name (e.g. ORDER_ID), a corresponding type of the data entity (e.g., character or string), a corresponding maximum size of the data entity (e.g. 2 bytes), a link for the data entity that can be used to look up the data entity in the input data 1341, and if applicable, a query (e.g., a SQL query) used to obtain a value for the data entity. The value for each data entity in a logical or physical data model structure can be obtained using a query from the input data 1341.

The corresponding maximum size of the data entity may be correlated with a type of the data entity. For example, a real or decimal number is typically stored in more bytes than an integer (int) or bigint, a character (char) is smaller than a string or varchar, a blob is the largest and least organized data type and holds a variable, typically large amount of data stored in an unstructured dump of bytes (e.g. data for an image), and a timestamp is typically larger than a date stamp as the timestamp allows for specifying down to the millisecond.

Another example data model can be a data model for daily sales of a product offering, and the associated logical data model structure may include one or more data entities from, for example: a product offering ID, a SKU number, a total number of inventory count, a total number of sales in the past 24 hours, a merchant ID, and a storefront ID. In some examples, the associated logical data model structure can be an object-oriented data model and generated based on one or more operation or business rules of a system such as the e-commerce platform 100. A corresponding physical data model structure may, for each data entity in the logical data model structure, include, for example, a data entity name (e.g. PRODUCT_ID or SKU_NO), a corresponding type of the data entity (e.g., integer or character), a corresponding maximum size of the data entity (e.g. 5 characters), a link for the data entity that can be used to look up the data entity in the input data 1341, and optionally a query that may be used to obtain a value for the data entity in the input data 1341.

In some embodiments, for a given data model, the data model definitions 1345 may include a defined user group for the data model. The defined user group may include user accounts that require access to the data model (e.g. the target audience for the data model). For example, a fulfillment center staff may require access to an unfulfilled order data model, and may be therefore included as a user account in the defined user group.

In some embodiments, both the logical data model structure and the physical data model structure may be stored in a text file, an XML file, a SQL file or in any other suitable format.

The data processing engine 350 may be configured to schedule a start time $T_C$ to process input data and build a data model. The start time $T_C$ may be determined based on an expected access time $T_A$ for the data model and a total time $T_R$ required to build the data model.

In the embodiment shown in FIG. 6, the data processing engine 350 includes the job scheduler 352. In various embodiments, the job scheduler 352 can be configured to determine or update a scheduled start time $T_C$ to build a data model based on an expected access time $T_A$ for the data model. The job scheduler 352 has access to an existing list of required data models, each with a default expected access time $T_A$. The list of required data models may be stored within the data processing engine 350 or the data facility 134. The job scheduler 352 can monitor the list of required data models and determine a scheduled start time $T_C$ to begin building a given data model based on an expected access time $T_A$ for that data model, as described in detail in this disclosure.

Once a start time $T_C$ to build a data model has been determined and stored, it may be updated by the job scheduler 352 if the data processing engine 350 receives information indicative of a change in one of several conditions that may affect the scheduled start time $T_C$. For example, if there is a sudden and unforeseen spike in input data collected, a sudden and unforeseen decrease in available computing resources, and/or an unexpected change of access time $T_A$ for the data model, the job scheduler 352 may update the start time $T_C$ to build the data model based in the changed condition(s). The job scheduler 352 can be configured to monitor the e-commerce platform 100 in order to detect any changes as mentioned above, and/or it may be notified by the e-commerce platform 100 when a change in input data, computing resources (e.g. server capacity), access time for a scheduled data model, or any other appropriate condition changes.

The expected access time $T_A$ for a given data model may be predefined in the e-commerce platform 100; for instance, it may be stored as part of each data model in the data model definitions 1345. For example, an expected access time $T_{A1}$ for one or more data models may be predefined, by a system administrator, as 8:00 AM each day from Monday to Friday, while an expected access time $T_{A2}$ for some other data models may be predefined as 9:00 AM each day.

In some embodiments, the job scheduler 352 may be configured to estimate an expected access time $T_A$ by refining a predefined access time based on historical records 1343. For example, the estimated expected access time $T_A$ may be estimated by adjusting the predefined access time based on recorded data indicating an actual access time over a period of time (e.g. N days). The recorded data may be part of the historical records 1343. If the predefined access time is 8:00 AM, and data from the historical records 1343 indicate that the actual access time varies between 8:10 AM to 8:20 AM on the past five days, the job scheduler 352 may estimate the expected access time $T_A$ based on those values. For example, the expected access time $T_A$ could be estimated to be 8:05 AM, based on a calculation of the mean value between the predefined access time 8:00 AM and the earliest actual access time 8:10 AM during the past five days.

In other embodiments, when a predefined value of the expected access time may be null (e.g., it has not been defined), the job scheduler 352 may be configured to estimate an expected access time $T_A$ based on historical data indicating an actual access time over a past period (e.g. N days). The estimated access time $T_A$ be the earliest actual access time in the past period, or may be an average value calculated based on multiple actual access times over the past period.

In another example, the estimated access time $T_A$ may be based on an actual access time for a similar data model based on historical records 1343, or based on the actual access time for a data model being used by a similar user group. In yet another example, the job scheduler 352 may obtain access to one or more users' calendar in order to extract information indicating when the data model may be accessed.

In some embodiments, a machine learning based algorithm may be implemented within the job scheduler 352, or as a separate sub-module, to estimate a most likely access time $T_A$ for a data model. The prediction provided by the machine learning model may be based on historical records 1343 indicating actual access time of the data model once it has been built. For example, if data models are consistently accessed at between 8:25 to 8:30 AM for each day in the past N days (e.g. a week), the machine learning based algorithm may estimate the expected access time $T_A$ to be 8:25 AM. A supervised learning approach may be used to train a machine learning model to learn a function for inferring the estimated access time $T_A$ for a data model, given certain information (e.g., types of input data for the data model, an ID for the data model, a user group of the data model, and so on). Training the machine learning model may use, as training data, historical records 1343 indicating actual access time for the data model and/or a similar data model, and/or another data model used by the same user group.

In addition to the expected access time $T_A$ for a data model, the job scheduler 352 may be configured to determine a total time $T_R$ required to build the data model. The total time $T_R$ may be calculated in a variety of manners, or based on a variety of factors. For example, the total time $T_R$ may be calculated based on a number of factors including, for example, one or more of: a total size of the input data, a definition of the data model as learned from the data model definitions 1345, historical records indicative of a past processing time to build the data model, and/or available computing resources or capacity.

The job scheduler 352 may query the input data module 354 to forecast a total size $S_F$ of input data for a given data model based on the expected access time $T_A$ for the data model. The input data module 354 can forecast the total size $S_F$ of the input data based on a size $S_X$ of existing input data and an estimated size $S_Y$ of input data received between a present time $T_P$ and a future time, such as the expected access time $T_A$.

In some embodiments, the input data module 354 can query the data model module 346 to obtain information regarding a data model. The data model module 346 can, based on a given data model ID or any unique identifier, look up the data model in the data model definitions 1345, to obtain a logical data model structure and a corresponding physical data model structure for the data model. The physical data model structure may include a link for each data entity contained in the data model. The data model module 356 may return a link for each data entity back to the input data module 354, which in turn, can use the link for each data entity to query the input data 1341 to obtain a size of input data associated with each data entity in the data model at a present time $T_P$. The input data model module 354 may then obtain a size $S_X$ of existing input data for a data model at time $T_P$ based on a respective size of input data associated with each data entity contained in the data model. The total size $S_X$ may be represented, for example, in terms of rows of data, or in bit, byte, KB, MB, GB, or TB.

The input data module 354 can use historical records 1343 to forecast an estimated size $S_Y$ of input data for the data model received between the present time $T_P$ and a future time, such as the expected access time $T_A$. The historical records 1343 may keep a record of a size of input data for a data model received at various points of time in a past period, and/or a record of an incremental size of input data accumulated for the data model during one or more time periods. For example, the historical records 1343 may have information indicating that input data for a given data model accumulated: 1 GB between 9:01 PM to 10 PM; 1.2 GB between 10:01 PM to 11 PM; 2 GB between 11:01 PM to 0:00 midnight; and so on. The size of input data accumulated during each period may be actual sizes of input recorded from the most recent time period (e.g. the day before), or may be an average value calculated based on actual sizes of input data recorded during the same period (e.g. 9:01 PM to 10 PM) for a number of selected (e.g., consecutive) days in the past. The input data module 354 can use the information above to determine that between 9:01 PM to midnight, the data model received approximately 4.2 GB ($S_Y$=4.2 GB) of input data. The input data module 354 can then forecast that, based on historical records 1343, approximately 4.2 GB of input data will be accumulated between a present time $T_P$=9:01 PM and midnight. By using historical records 1343 to estimate a size $S_Y$ of accumulated input data in each time period, the input data module 354 may account for irregularities or bursts in data collection. For example, when the e-commerce platform 100 operates globally, and servers in each geography upload collected data from one or more production databases to the data facility 134 at 2 AM local time, the input data may arrive in bursts as servers in various time zones upload their respective contributions to the input data at 2 AM local time.

Optionally, the input data module 354 can be configured to, in order to account for potential error or unanticipated surge in data collection, add apply an adjustment factor in estimating the size $S_Y$ of input data received between a present time $T_P$ and a future time. For instance, the input data module 354 may add 10% to the size of input data (4.2 GB) as determined based on historical records 1343, which means, using the same example above, approximately $S_Y$=4.62 GB of input data will be accumulated between a present time $T_P$ 9:01 PM and midnight. The adjustment factor may be predefined in the system.

The input data module 354 may, therefore, forecast or estimate a size $S_Y$ of input data for the data model received between the present time $T_P$ and a future time. In some embodiments, the future time can be the expected access time $T_A$. The input data module 354 can then add the size $S_X$ of the existing input data at the present time $T_P$ to the estimated size $S_Y$ of input data received between the present time $T_P$ and the expected access time $T_A$, in order to estimate the total size $S_F$ of input data that will be collected to build the data model. An adjustment factor (e.g. 5% or 10%) may be added in the estimation of $S_F$ to account for any unforeseen spike in data collection between the present time and the future time.

The input data module 354 sends the total size $S_F$ of input data that will be collected to build a data model at a future time (e.g., expected access time $T_A$) to the job scheduler 352, which can then determine a total time $T_R$ required to build the data model based on the total size $S_F$ of the input data and a definition of the data model as stored in the data model definitions 1345. Specifically, the job scheduler 352 may send a query to the data model module 356 to retrieve the data model definition for the data model from data model definitions 1345. The retrieved data model definition for the data model may include a logical data model structure, which may indicate if the data model depends on any other data model. For example, as described earlier, a data model for an outstanding (unfulfilled) order can include (i.e., depend on) other data models including but not limited to,
for example, an item data model for each product offering sold, a customer data model, a payment data model, and a shipment data model.

In complex processes where a data model depends on other data models, the job scheduler 352 can be configured to orchestrate the build process of multiple data models based on a calculation of a compounded total time to build a given data model that depends on other data models, the compounded total time taking into account both the time to build the data model and the time to build any prerequisite data models. (Notably, in some cases this could involve taking in account multiple layers of such dependencies between data models.) In addition, the job scheduler 352 can calculate an optimal start time to build each of a plurality of data models to ensure that all the data models are available by the expected access time. For example, when the retrieved data model definition for a given data model D1 includes another data model D2, the job scheduler 352 can be configured to determine first the total time $T_{R\_D2}$ required to build the data model D2 prior to estimating the total time $T_{R\_D1}$ required to build the data model D1. In some embodiments, when the retrieved data model definition for a given data model D1 includes multiple data models D2, D3 . . . DM, the job scheduler 352 can be configured to determine first the total time $T_{R\_D2}$, $T_{R\_D3}$, . . . $T_{R\_DM}$ required to build each of the data models D2, D3 . . . DM on which the data model D1 depends, prior to estimating the total time $T_{R\_D1}$ required to build the data model D1.

Typically, circular dependency among data models (e.g. data model D1 includes D2, which includes D1 again) is rare. If, however, when circular dependency exists in one or more data models to be built, the job scheduler 352 can be configured to break the dependency chain by using a past version of one or more data models involved in such a dependency cycle (e.g. D1) from a previous period as an input to the generation of other data models (e.g. D2) involved in the dependency at the cost of data freshness.

$T_R$ can be estimated by the job scheduler 352 based on at least historical information for each data model as stored in the historical records 1343. In various embodiments, given a data model D1, the job scheduler 352 may access the historical records 1343 to obtain information indicating an average processing time to build the data model D1. An example snapshot of a data model record stored in the historical records 1343 is below:

| Data Model No. | 001 | 002 | 003 |
|---|---|---|---|
| Size of input data $S_H$ | 1.3 GB | 0.8 GB | 5 GB |
| Average historical processing time $T_H$ | 30 minutes | 15 minutes | 50 minutes |
| Average start time | 3:00 AM | 3:00 AM | 2:00 AM |
| Average end time | 3:30 AM | 3:15 AM | 2:50 AM |
| Average capacity $C_H$ during data model build | 100 servers | 100 servers | 80 servers |

In some embodiments, the job scheduler 352 can be configured to retrieve only information that is stored or calculated based on the most recent events (e.g. average historical processing time $T_H$ calculated based on the most recent 3 or 5 days), in order to ensure that only the most recent historical data is taken into account. An average value calculated based on a set of historical values and stored in the historical records 1343 may also be periodically refreshed (e.g. at 2 AM each morning) so as to provide up-to-date statistics regarding the data models.

In some embodiments, a query used in retrieving a value for a data entity in a data model may impact the historical (or forecasted) processing time required to build the data model. For example, queries that require searching text to find a match (e.g. column_1="In-store Pick-up") may take longer than queries that require only searching numbers. For another example, queries that use fuzzy matches (e.g. column_1="% Pick-up %", which would match "In-store Pick-up", "Curbside Pick-up" and "Pick-up In-store") may take longer than a simple text query without fuzzy matches. For yet another example, querying tables without indices may tend to take longer than querying tables with indices. In addition, queries that require joining of multiple tables to amalgamate data across multiple sources may take longer than querying just one table or one source, as, for example, a temporary table need to be created to store temporary data (e.g., to materialize the join), and such a temporary table may grow to be large in size such as if multiple rows from different tables are represented in each row of the temporary table.

In some embodiments, data model algorithms used in building a data model may also impact the historical (or forecasted) processing time required to build the data model. For example, some data models may require use of algorithms that might be more time-consuming or processor intensive than algorithms employed in generating or updating other data models. For example, a first data model may require retrieving all of the names of customers for a store, storing all the names in a temporary table, and then for each name, individually looking up the customer's payment information in a second table. A second data model may simply require performing a JOIN query which retrieves each customer's name and his or her payment information in one query by joining together two tables (e.g., CUSTOMER_NAME table and CUSTOMER_PAYMENT table), which is only a single query to be run. The first data model may take much longer to build than the second data model would.

In some embodiments, the query engine used to process the queries itself may further impact the historical (or forecasted) processing time required to build the data model. For example, a query engine which can process multiple jobs in parallel may be faster than a query engine that can only handle a single job at one time (i.e., in sequence). For another example, a query engine that can distribute multiple jobs across different servers may be faster than processing all the jobs on one server.

By using the average historical processing time $T_H$ in the historical records 1343 as a starting point to estimate a total time $T_R$ required to build a data model, the job scheduler 352 operates on the assumption that once a data model is defined in the data model definitions 1345, the queries and algorithms specified in the data model definition for the data model do not often change, or do not change randomly. Any variance in the time needed to build the data model as a result of different queries or algorithms being run, such as when the query engine optimizes one or more queries during the data model building process, can be accommodated by using a historical average value over a period of time (e.g. the past five days).

In some embodiments, when the job scheduler 352 cannot find a particular data model D1 in the historical records 1343, the job scheduler 352 may be scheduled to retrieve historical information of a different data model D2 that is similar in structure to the data model D1, and use the historical information of the data model D2 as a starting point to estimate a total time $T_R$ required to build the data model D1. Similarity in structure can be determined, for example, based on comparison of respective logical data model structures or respective physical data model structures as obtained from data model definitions 1345. For example, the logical data model structure (or the corresponding physical data model structure) for a data model of a first store of a merchant may be similar to the logical data model structure (or the corresponding physical data model structure) of a data model for a second store of the same merchant. For another example, a data model for an unfulfilled order may be similar in structure to a data model for a fulfilled order, with the only difference in the logical data model structure being a data entity indicating that the order has been fulfilled or shipped.

Referring back to the example table in the historical records 1343 above, the total time $T_R$ required to build a data model may be associated with, and impacted by, a total size $S_F$ of input data, and an amount of available computing resources (e.g., a total number of servers available during the data model building process). In various embodiments, given a historical average processing time $T_H$ for a data model retrieved from the historical records 1343, the job scheduler 352 can be configured to update $T_H$ based on a first factor $F_1$ associated with the total size $S_F$ of input data for the data model, as estimated by the input data module 354, and/or on a second factor $F_2$ associated with an amount of computing resources available, which can be estimated by a capacity estimator 358. For example, $T_R$ can be determined based on the formula $T_R = T_H \times F_1 \times F_2$.

In some embodiments, the first factor $F_1$ may be a ratio between the total size $S_F$ of input data for the data model and the historical size $S_H$ of input data for the data model from the historical records 1343, i.e., $F_1 = S_F/S_H$.

In some embodiments, the second factor $F_2$ may be a ratio between the historical amount $C_H$ of computing resources available for the data model from the historical records 1343 and an estimated amount $C_F$ of computing resources available, which can be estimated by the capacity estimator 358, i.e., $F_2 = C_H/C_F$.

In some embodiments, in order to estimate the amount $C_F$ of computing resources available for a data model, the capacity estimator 358 may be configured to access the historical records 1343 to obtain one or more records indicating a respective amount of computing resources available at different points in time during a past period. The amount of computing resources may be expressed in a variety of manners such as, for example, in terms of a total number of available servers, in terms of a total number of available CPU cores, and/or in terms of a total amount of memory (e.g., RAM) available. The historical records 1343 may indicate, as an example, there has, historically, been 100 servers available at 9:00 PM, 98 servers available at 10:00 PM, and 90 servers available at 11:00 PM, and so on. The number of available servers during each period may be, for example, an actual number of servers available at a particular point in time (e.g. 9:00 PM yesterday), or may be an average value calculated based on an actual total number of available servers at a point in time for each day over a number of consecutive days in the past. An assumption made in scheduling may be that under normal circumstances, the number of servers available, or computing resources available in general for the e-commerce platform 100, is cyclic and tends to exhibit the same pattern on a daily basis.

Based on the historical number of available servers at different points in time obtained from the historical records 1343, the capacity estimator 358 may estimate, in a similar fashion, the number of available servers at various points in time from the present time $T_P$ to a future time. Using the example in the paragraph above, when the present time $T_P$ is 8:30 PM, the capacity estimator 358 might estimate that 100 servers are likely available at 9:00 PM, 98 servers are likely available at 10:00 PM, and 90 servers are available at 11:00 PM.

In some embodiments, instead of or in addition to using the historical records 1343 to estimate the amount of computing resources available, the capacity estimator 358 can be configured to query the data facility 134 to obtain, if and when available, information representative of how much computing resources (e.g., a total number of servers) that will be available for data model building between the present time $T_P$ and a future time. For instance, the data facility 134 may have a schedule of computing resources allocated to data model building at any hour or half hour of the day. This schedule may be updated in real time or near real time by the e-commerce platform 100 or a system administrator depending on an overall computing resource allocation scheme for the entire e-commerce platform 100.

In some embodiments, if and when any additional computing resource (e.g., servers) becomes available, which has not been accounted for by the historical records 1343 or any existing computing resource allocation, the additional computing resource may be detected by the capacity estimator 358 and added onto the current estimate of computing resources available between the present time $T_P$ and a future time.

The job scheduler 352 can obtain the estimated amount $C_F$ of computing resources available from the capacity estimator 358, which may include a list of estimated amounts $C_{F1}$, $C_{F2}$, $C_{F3}$ ... $C_{FN}$ of computing resources available, each corresponding to a particular point in time (e.g. 9 PM, 10 PM, 11 PM) between the present time $T_P$ and the future time (e.g. 11 M). For each listed amount $C_{F, [F=F1, F2, F3 ... FN]}$ of computing resources available, the job scheduler 352 may compute a corresponding second factors $F_2$ as a ratio between the historical size $C_H$ of input data for the data model and the respective amount $C_F$ of computing resources available estimated by the capacity estimator 358, i.e., $F_2 = C_H / C_F$.

In some embodiments, a respective total time $T_R$ required for building the data model can be estimated starting at each of a plurality of future times (e.g., 9 PM, 10 PM, 11 PM) between the present time (e.g. 8:30 PM) and the future time (e.g. 11 PM), which may be used later to calculate a corresponding start time $T_C$ for starting the building process of the data model. The job scheduler 352 can compute a respective total time $T_R$ (e.g., $T_{R\_9P}$ at t=9 PM, $T_{R\_10P}$ at t=10 PM, ... ) required to build a given data model at various points in time (e.g., 9 PM, 10 PM, ... ) between the present time $T_P$ and the expected access time $T_A$. Each respective total time $T_R$ may be computed based on a respective estimated amount $C_F$ of computing resource available at the corresponding point in time (e.g., 9 PM, 10 PM, ... ), using the formula $T_R = T_H \times F_1 \times F_2$. In some embodiments, $T_R$ may be adjusted using an adjustment factor to better ensure that the data model will be completed before the expected access time $T_A$, e.g., $T_R = T_R \times 1.1$, where 1.1 is an example adjustment factor and can be predefined by the data processing engine 350 or a system administrator.

Next, the job scheduler 352 may compute, for each total time $T_R$ required to build the data model at a point in time $T_L$ (e.g., $T_L$=9 PM, 10 PM, ... ) between the present time $T_P$ and the expected access time $T_A$, a corresponding start time $T_C$ to start building the data model can be calculated based on the respective total time $T_R$. For example, if the expected access time $T_A$ is 11:59:00 PM, and $T_R$ at $T_L$=9 PM is 50 minutes, then the corresponding start time $T_{C1}$ to start building the data model can be set to 9:59:59 PM at the latest. $T_{C1}$ in this case should not be set to a time later than 9:59:59 PM because 9:59:59 PM is the latest time to which the estimated amount $C_F$ of computing resources available at 9:00 PM would apply. If $T_R$ at $T_L$=10 PM is 90 minutes, then the start time $T_{C2}$ to start building the data model can be set to 10:29 PM at the latest; and if $T_R$ at $T_L$=11 PM is 80 minutes, then the corresponding start time $T_{C3}$ to start building the data model is null, since 80 minutes before the expected access time $T_A$ 11:59:00 PM is earlier than $T_L$=11 PM. The job scheduler 352 may then choose the latest possible start time among $T_{C1}$, $T_{C2}$, $T_{C3}$ to be $T_C$ for scheduling the data model build, which in this case is $T_{C2}$=10:29 PM.

In some embodiments, the job scheduler 352 can be configured to constantly monitor the data facility 134 and the core commerce facility 136 for any indication that the total size $S_F$ of input data, the amount $C_F$ of available computing resources, or the expected access time $T_A$ may need to be updated. If any of the total size $S_F$ of input data, the amount $C_F$ of available computing resources, and the expected access time $T_A$ has changed, or is highly likely to change, the job scheduler 352 can update the start time $T_C$ to start building the data model accordingly.

For example, the job scheduler 352 can determine, prior to the determined time $T_C$ to start building the data model, that the total size $S_F$ of the input data has increased (or decreased) to $S_{F'}$, and estimate a revised total time $T_{R'}$ required for building the data model based on the increased (or decreased) size $S_{F'}$ of the input data and the definition of the data model, the revised total time $T_{R'}$ greater (or less) than the previously estimated total time $T_R$ for building the data model. The job scheduler 352 can next determine an updated time $T_{C'}$ to start building the data model based on the expected access time $T_A$ for the data model and the revised total time $T_{R'}$ required to build the data model, the updated time $T_{C'}$ being earlier (or later) than the previously determined time $T_C$ to start building the data model. The job scheduler 352 can then reschedule the building of the data model to start at the earlier (or later) updated time $T_{C'}$.

For another example, the job scheduler 352 can: obtain, prior to the determined time $T_C$ to start building the data model, an updated expected access time $T_{A'}$ for the data model; determine an updated time $T_{C'}$ to start building the data model based on the updated expected access time $T_{A'}$ for the data model and the estimated total time $T_R$ required for building the data model; and reschedule the building of the data model to start at the updated time $T_{C'}$.

For yet another example, the job scheduler 352 can: obtain, prior to the determined time $T_C$ to start building the data model, an updated expected access time $T_A'$ for the data model; determine, if appropriate, an updated size $S_F'$ of the input data based on the updated access time $T_A'$; and estimate a revised total time $T_R'$ required for building the data model based on the updated size $S_F'$ of the input data and the definition of the data model. The job scheduler 352 can next determine an updated time $T_C'$ to start building the data model based on the updated expected access time $T_A'$ for the data model and the revised total time $T_R'$ required to build the data model. The job scheduler 352 can then reschedule the building of the data model to start at the earlier (or later) updated time $T_C'$.

Optionally, if the start time $T_C$ for a data model has been calculated a number of times and has stayed relatively constant (e.g. always in the range of 8 AM-8:20 AM), the job scheduler 352 can fix the start time $T_C$ at a time between 8:00 AM to 8:20 AM, so that the data processing engine 350 does not have to spend resources calculating the start time $T_C$. There may be a periodic check (e.g. weekly or monthly) to adjust the start time $T_C$ if necessary or as set by the system administrator. Meanwhile, the dynamic start time $T_C$ for other data models may be continually refined.

Figure 7:
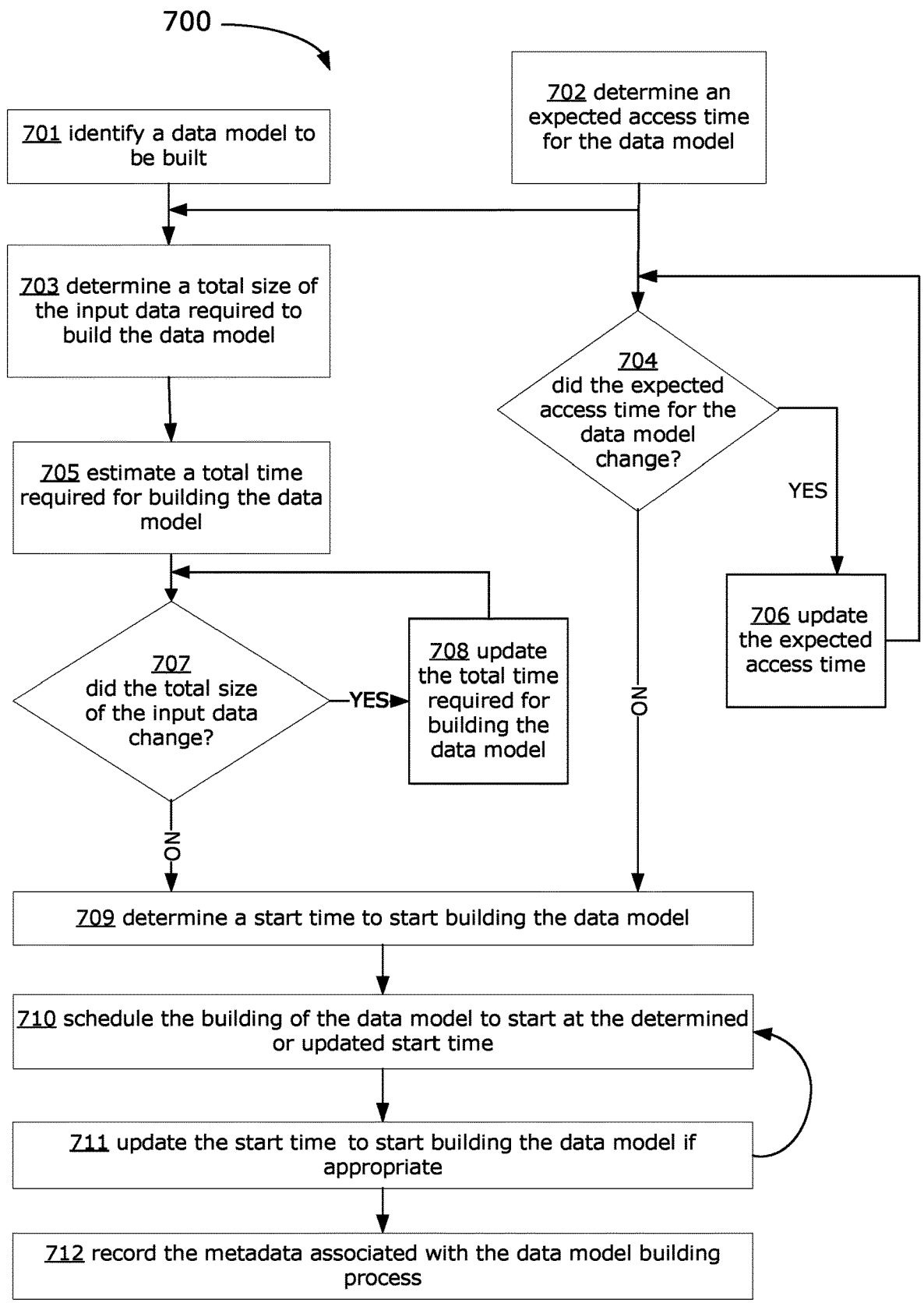
FIG. 7 is a flowchart illustrating an example process for dynamically scheduling data model building jobs.

FIG. 7 is a flowchart illustrating an example process 700 for dynamically scheduling data model building jobs. The process 700 may be implemented by the e-commerce platform 100 (e.g., using the data processing engine 350). The process 700 may be implemented by a processing device executing instructions (e.g., at the core server 510 or the applications server 530).

At operation 701, a data model to be built can be identified based on a unique identifier. The data facility 134 or the data processing engine 350 may store a list of required data models that need to be built each day, for example based on a predefined table of user requirements or business requirements. The list of data models may identify each data model by the unique identifier, or may contain a link to a data model definition stored on the data facility 134.

At operation 702, an expected access time $T_A$ can be determined. For example, the list of required data models may contain a default expected access time $T_A$ for each required data model. The expected access time $T_A$ for a given data model may be predefined in the e-commerce platform 100; for instance, it may be stored as part of each data model in the data model definitions 1345. In some embodiments, the estimated expected access time $T_A$ may be estimated by adjusting the predefined access time based on historical data indicating an actual access time over a period of time (e.g. N days). In other embodiments, the expected access time $T_A$ may be estimated based on historical data alone. For instance, the estimated access time $T_A$ can be set to the earliest actual access time in a past period, or may be an average value calculated based on the multiple actual access times over the past period.

At operation 703, a total size $S_F$ of input data required to build the data model can be determined. For example, the size of the input data can be determined based on a size $S_X$ of existing input data and an estimated size $S_Y$ of input data received between a present time $T_P$ and a future time, such as the expected access time $T_A$. The size $S_X$ of existing input data can be obtained by querying a data facility 134 storing all the input data that has been collected thus far for the data model. For instance, the size $S_X$ of existing input data for a data model at the present time $T_P$ can be obtained based on a respective size of input data associated with each data entity contained in the data model. The sizes may be represented in terms of rows of data, or in bit, byte, KB, MB, GB, or TB.

In addition, the estimated size $S_Y$ of input data received between a present time $T_P$ and the future time can be determined based on historical records 1343, which has information representative of historical size of input data received for each data model during various periods of time, e.g., from 9 PM to 10 PM, and from 10:01 PM to 11 PM. For example, the estimated size $S_Y$ of input data may be determined based on a size of input data actually received during the same period on a previous day. In some embodiments, in order to account for potential error or unanticipated surge in data collection, an adjustment factor may be added or applied in estimating the size $S_Y$ of input data received between a present time $T_P$ and the future time. Next, the size $S_X$ of the existing input data at the present time $T_P$ and the estimated size $S_Y$ of input data received between the present time $T_P$ and the expected access time $T_A$ may be added together and stored as the estimated total size $S_F$ of input data that will be collected to build the data model.

At operation 704, the data processing engine 350 may periodically check if the expected access time $T_A$ needs to be updated since the last calculation of $T_A$ or since the last check. The check may be implemented by re-determining the expected access time $T_A$ based on the most recent operating conditions, which may or may not have changed since the last calculation of $T_A$ or since the last check. If the re-determined expected access time $T_A$ is different from the previous value for the expected access time, then at operation 706, the re-determined value for the expected access time $T_A$ may be stored as the updated expected access time $T_A$. In some embodiments, if a system administrator or a system component of the e-commerce platform 100 has requested an updated access time $T_{A'}$ for the data model, a notification may be sent to the data processing engine 350, and at operation 706, the updated value for the expected access time $T_A$ may be stored, replacing the previous value.

In some embodiments, when the expected access time $T_A$ is updated at operation 706, the updated value can be sent to operation 703 to re-calculate a total size $S_F$ of the input data for the data model, based on the updated expected access time $T_A$.

At operation 705, a total time $T_R$ required for building the data model may be determined based on the total size $S_F$ of the input data, a definition of the data model, historical records indicative of a past processing time to build the data model, and/or available computing resources or capacity, as described herein in the disclosure. In some embodiments, based on the historical records, a respective total time $T_R$ required for building the data model can be estimated starting at each of a plurality of future times (e.g., $T_{R\_9P}$ at t=9 PM, $T_{R\_10P}$ at t=10 PM, ... ) between the present time $T_P$ and the expected access time $T_A$. Each respective total time $T_R$ can be computed based on a respective estimated amount $C_F$ of computing resources available at the corresponding point in time (e.g., 9 PM, 10 PM, ... ) and the total size $S_F$ of the input data.

At operation 707, the data processing engine 350 may periodically (e.g., every 30 minutes) check if the total size $S_F$ for the input data required for building the data model needs to be updated since the last calculation of $S_F$ or since the last check. For example, an unusual or unexpected surge in web traffic to the e-commerce platform 100 may be detected, which could be interpreted as indicating that the input data for the date model may have increased. In this case, the data processing engine 350 may re-calculate and update the total size $S_F$ for the input data. For another example, a system administrator or a system component of the e-commerce platform 100 may send a notification indicating that input data in general may be increased or decreased based on a predicted or detected event. For instance, a flash sale may lead to an increased input data for an online store, while a widespread power outage affecting a large metropolitan area may indicate a decreased input data. When such an event is predicted or detected by the e-commerce platform 100, the total size $S_F$ for the input data can be re-calculated and updated accordingly.

At operation 708, the total time $T_R$ required for building the data model may be revised based on the updated total size $S_F$ for the input data for the data model.

At operation 709, a start time $T_C$ to start building the data model can be calculated based on the expected access time $T_A$ for the data model and the estimated total time $T_R$ required to build the data model. When there are a plurality of total times $T_R$ estimated for a data model building process, with each $T_R$ associated with a respective future time from a plurality of future times (e.g., $T_{R\_9P}$ at t=9 PM, $T_{R\_10P}$ at t=10 PM, . . . ) between the present time and the expected access time $T_A$, a start time $T_C$ can be calculated for each $T_R$ and associated with the respective future time from the plurality of future times. A final start time $T_C$ FINAL can then be selected from the plurality of start times $T_C$.

At operation 710, the data model may be scheduled to be built at the determined or updated start time $T_C$ or $T_C$_FINAL.

Throughout the process 700, the data processing engine 350 may periodically monitor the data facility 134 and the core commerce facility 136 for any indication that the total size $S_F$ of input data, the amount $C_F$ of available computing resources, or the expected access time $T_A$ may need to be updated. If any of the total size $S_F$ of input data, the amount $C_F$ of available computing resources, and the expected access time $T_A$ has changed, or is highly likely to change, at operation 711, the start time $T_C$ to start building the data model may be updated by re-calculating one or more of the total size $S_F$ of input data, the amount $C_F$ of available computing resources, and the expected access time $T_A$. In the event that the start time $T_C$ or $T_C$_FINAL has been updated at operation 711, the data processing engine 350 may go back to operation 710 to schedule the building of the data model to start at the updated start time.

At operation 712, during the data model building process, various metadata regarding the data model being built can be recorded and stored in the historical records 1343, including for example: the actual total size of input data, the actual time spent on building the data model, the actual amount of computing resources available. After the data model has been built and accessed, additional metadata can be recorded and stored in the historical records 1343, including for example: the actual access time for the data model, and the number of times it was accessed.

Instead of batch-scheduling data processing jobs in a static manner (e.g., typically scheduling jobs when resource usage tends to be the lowest), the described embodiments of the data processing engine 350 and the process 700 use historical records of data model building, as well as existing information (such as, for example, knowledge about the input data to be processed, the data models to be built, or available computing resources), to estimate a total amount of time most likely required to start and finish the data model building, and to then schedule the data model building based on the estimated total amount of time required and an expected access time for the built data models.

The approach in this disclosure might be considered counter-intuitive to the traditional data processing approach, because scheduling the data models to be built as late as possible, in order to capture the most amount of input data possible, typically would not coincide the time(s) of lowest resource usage, which is typically the case and purpose for batch-scheduling. Further, the embodiments disclosed herein enable tailored build times for different data models, which again is different from a traditional batch-scheduling solution. Having different build times for different data models may assist with better allocation of the computing resources, as data processing jobs are spread out over a period of time.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

All referenced documents are hereby incorporated by reference in their entireties.

The invention claimed is:

1. A method, performed by a processing device, the method comprising:
   identifying a first data model to be built, the first data model being associated with a data model definition defining a data model structure to use for building the first data model and the data model definition including links for data entities representing input data to be used in building the first data model;
   determining a total size of input data by using each link to query a data facility to obtain a respective size of input data associated with the respective data entity, and computing the total size of input data based on the respective sizes of input data obtained from the querying;
   obtaining an expected access time for the first data model;
   computing a first estimated total time required for building the first data model based on the total size of input data and the data model definition;
   determining a determined time to start building the first data model based on the expected access time for the first data model and the first estimated total time required for building the first data model; and
   scheduling building of the first data model to start at the determined time.

2. The method of claim 1, further comprising:
   monitoring the data facility for any change in the total size of input data;

determining, prior to the determined time, that the total size of input data has increased;

computing a second estimated total time required for building the first data model based on the increased total size of input data and the data model definition, the second estimated total time being greater than the first estimated total time for building the first data model; and updating the determined time to start building the first data model earlier based on the expected access time for the first data model and the second estimated total time required for building the first data model.

3. The method of claim 1, further comprising:
monitoring the data facility for any change in the total size of input data;
determining, prior to the determined time, that the total size of the input data has decreased;
computing a third estimated total time required for building the first data model based on the decreased total size of input data and the data model definition, the third estimated total time being less than the first estimated total time for building the first data model; and
updating the determined time to start building the first data model later based on the expected access time for the first data model and the third estimated total time required for building the first data model.

4. The method of claim 1, further comprising:
obtaining, prior to the determined time, an updated expected access time for the first data model; and
updating the determined time to start building the first data model based on the updated expected access time for the first data model and the estimated total time required for building the first data model.

5. The method of claim 1, wherein determining the total size of input data further comprises:
querying historical records stored in the data facility to forecast an estimated size of input data that will be generated between a current time and the expected access time; and
including the estimated size of input data in computation of the total size of input data.

6. The method of claim 1, wherein the expected access time is determined based on historical records.

7. The method of claim 1, wherein the first estimated total time required for building the first data model is computed based on historical records including: data representing a historical time taken to build the first data model.

8. The method of claim 1, wherein the first estimated total time required for building the first data model is computed based on historical records including: data representing a historical time taken to build a different second data model that is similar in structure to the first data model, or a historical server capacity.

9. The method of claim 1, wherein the building of the first data model is dependent on a second data model, and wherein computing the first estimated total time required for building the first data model includes computing a total time required to build the second data model.

10. The method of claim 5, wherein the estimated size of input data is forecasted based on an average size of input data previously generated per unit time.

11. The method of claim 1, further comprising:
determining an amount of computing resources available to build the first data model,
wherein the first estimated total time required for building the first data model is further computed based on the amount of computing resources available to build the first data model.

12. The method of claim 11, wherein determining the amount of computing resources available includes determining, based on historical records, a respective amount of computing resources available at each of a plurality of future times.

13. The method of claim 12, comprising:
determining, based on the historical records, a respective total time required for building the first data model starting at each of the plurality of future times; and
determining the determined time to start building the first data model based on the estimated respective total times required for building the first data model starting at each of the plurality of future times.

14. A system comprising:
a processing device in communication with a storage, the processing device configured to execute instructions to cause the system to:
identify a first data model to be built, the first data model being associated with a data model definition defining a data model structure to use for building the first data model and the data model definition including links for data entities representing input data to be used in building the first data model;
determine a total size of the input data by using each link to query a data facility to obtain a respective size of input data associated with the respective data entity, and computing the total size of input data based on the respective sizes of input data obtained from the querying;
obtain an expected access time for the first data model;
compute a first estimated total time required for building the first data model based on the total size of the input data and the data model definition;
determine a determined time to start building the first data model based on the expected access time for the first data model and the first estimated total time required for building the first data model; and
scheduling building of the first data model to start at the determined time.

15. The system of claim 14, wherein the processing device is configured to execute the instructions to cause the system to:
monitor the data facility for any change in the total size of input data;
determine, prior to the determined time, that the total size of the input data has increased;
compute a second estimated total time required for building the first data model based on the increased total size of input data and the data model definition, the second estimated total time being greater than the first estimated total time for building the first data model; and
update the determined time to start building the first data model earlier based on the expected access time for the first data model and the second estimated total time required for building the first data model.

16. The system of claim 14, wherein the processing device is configured to execute the instructions to cause the system to:
monitor the data facility for any change in the total size of input data;
determine, prior to the determined time, that the total size of input data has decreased;

compute a third estimated total time required for building the first data model based on the decreased total size of input data and the data model definition, the third estimated total time being less than the first estimated total time for building the first data model; and update the determined time to start building the first data model later based on the expected access time for the first data model and the third estimated total time required for building the first data model.

17. The system of claim 14, wherein the processing device is configured to execute the instructions to cause the system to:
obtain, prior to the determined time, an updated expected access time for the first data model; and
update the determined time to start building the first data model based on the updated expected access time for the first data model and the estimated total time required for building the first data model.

18. The system of claim 14, wherein the first estimated total time required for building the first data model is computed based on historical records including: data representing a historical time taken to build the first data model, data representing a historical time taken to build a different second data model that is similar in structure to the first data model, or a historical server capacity.

19. The system of claim 14, wherein the building of the first data model is dependent on a second data model, and wherein computing the first estimated total time required for building the first data model includes computing a total time required to build the second data model.

20. The system of claim 14, wherein the processing device is configured to execute the instructions to cause the system to:
determine an amount of computing resources available to build the first data model,
wherein the first estimated total time required for building the first data model is further computed based on the amount of computing resources available to build the first data model.

21. The system of claim 20, wherein the processing device is configured to execute the instructions to cause the system to, in order to determine the amount of computing resources available: determine, based on historical records, a respective amount of computing resources available at each of a plurality of future times.

22. The system of claim 21, wherein the processing device is configured to execute the instructions to cause the system to:
determine, based on the historical records, a respective total time required for building the first data model starting at each of the plurality of future times; and
determine the determined time to start building the first data model based on the estimated respective total times required for building the first data model starting at each of the plurality of future times.

23. A non-transitory computer-readable medium having computer-executable instructions stored thereon, wherein the instructions, when executed by a processing device of a system, cause the system to:
identify a first data model to be built, the first data model being associated with a data model definition defining a data model structure to use for building the first data model and the data model definition including links for data entities representing input data to be used in building the first data model;
determine a total size of input data by using each link to query a data facility to obtain a respective size of input data associated with the respective data entity, and computing the total size of input data based on the respective sizes of input data obtained from the querying;
obtain an expected access time for the first data model;
compute a first estimated total time required for building the first data model based on the total size of input data and the data model definition;
determine a determined time to start building the first data model based on the expected access time for the first data model and the first estimated total time required for building the first data model; and
schedule building of the first data model to start at the determined time.

24. The system of claim 14, wherein the processing device is configured to execute the instructions to cause the system to determine the total size of input data further by:
querying historical records stored in the data facility to forecast an estimated size of input data that will be generated between a current time and the expected access time; and
including the estimated size of input data in computation of the total size of input data.

25. The method of claim 1, further comprising:
during building of the first data model, recording and storing metadata in as a historical record in the data facility, the metadata including at least an actual total size of input data and an actual time for building the first data model;
wherein the historical record is used for determining a next expected access time for the first data model and for computing a next estimated total time required for building a next instance of the first data model.

* * * * *